(12) United States Patent
Akhilesham et al.

(10) Patent No.: US 12,494,642 B2
(45) Date of Patent: Dec. 9, 2025

(54) DIRECTED ENERGY CONVERSION AND DISTRIBUTION

(71) Applicant: INTERNATIONAL BUSINESS MACHINES CORPORATION, Armonk, NY (US)

(72) Inventors: Madhu Akhilesham, Pune (IN); Shikhar Kwatra, San Jose, CA (US); Venkata Vara Prasad Karri, Visakhapatnam (IN); Shailendra Moyal, Pune (IN); Akash U. Dhoot, Pune (IN)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 17/493,833

(22) Filed: Oct. 4, 2021

(65) Prior Publication Data

US 2023/0105098 A1    Apr. 6, 2023

(51) Int. Cl.
*H02J 3/00*    (2006.01)

(52) U.S. Cl.
CPC .............. *H02J 3/004* (2020.01); *H02J 3/003* (2020.01); *H02J 2300/20* (2020.01)

(58) Field of Classification Search
CPC ...................................................... H02J 3/004
See application file for complete search history.

(56) References Cited

U.S. PATENT DOCUMENTS 9,256,214 B2 * 2/2016 Lee .......................... H04L 12/10
9,786,265 B2 10/2017 Beckman et al.
10,370,093 B1 * 8/2019 Beckman ................ G08G 5/80
10,529,361 B2 1/2020 Wang
10,546,590 B2 1/2020 Sharma et al.
2005/0195988 A1 9/2005 Tashev et al.
2008/0168283 A1 * 7/2008 Penning .................. G06F 1/263
                                                                713/310
2011/0233941 A1 * 9/2011 Jee ........................ H02K 35/02
                                                                290/1 R (Continued)

FOREIGN PATENT DOCUMENTS

CN          103352816 A      10/2013
CN          106485342 A       3/2017

(Continued)

OTHER PUBLICATIONS

WIPO Application No. PCT/CN2022/122618, International Search Report and Written Opinion, Nov. 25, 2022, 11 pg.

(Continued)

*Primary Examiner* — Nathan L Laughlin
(74) *Attorney, Agent, or Firm* — CHIP LAW GROUP

(57) ABSTRACT

Energy conversion and distribution can include converting sound energy to electrical energy using one or more energy converters positioned within a predetermined area. Multiple devices can be classified to indicate an energy requirement of each device, and the electrical energy converted from sound energy can be allocated to one or more of the devices based on the classifying. Delivery of the electrical energy allocated to each of the one or more devices can be controlled using a switching mechanism to create a transmission channel with respect to each of the one or more devices.

19 Claims, 5 Drawing Sheets

(56) References Cited

U.S. PATENT DOCUMENTS

| | | | |
|---|---|---|---|
| 2013/0214735 A1* | 8/2013 | Kang | H02J 50/12 |
| | | | 320/108 |
| 2016/0005414 A1* | 1/2016 | Lainez | G10L 25/69 |
| | | | 704/226 |
| 2017/0061444 A1 | 3/2017 | Wall et al. | |
| 2017/0154618 A1 | 6/2017 | Beckman et al. | |
| 2022/0140610 A1* | 5/2022 | Bangalore | H02J 3/322 |
| | | | 320/101 |

FOREIGN PATENT DOCUMENTS

| | | |
|---|---|---|
| CN | 112994199 A | 6/2021 |
| JP | 2019170144 A | 10/2019 |
| RO | 128582 A2 | 6/2013 |
| WO | 2011050697 A1 | 5/2011 |
| WO | 2023/056887 A1 | 4/2023 |

OTHER PUBLICATIONS

Mell, P. et al., The NIST Definition of Cloud Computing, National Institute of Standards and Technology, U.S. Dept. of Commerce, Special Publication 800-145, Sep. 2011, 7 pg.

Garg, M. et al., "Generation of electrical energy from sound energy," In 2015 International Conference on Signal Processing and Communication (ICSC) Mar. 16, 2015 (pp. 410-412). IEEE [Abstract].

Bejgam, R. et al., "Conversion of Sound Energy into Electrical Energy," International Journal of Research in Engineering, Science and Management, vol. 3, No. 6, Jun. 2020, pp. 104-107.

Fang, L.H. et al., "Exploring Piezoelectric for Sound Wave as Energy Harvester," Energy Procedia, vol. 105, May 2017, pp. 459-466.

Farghaly, Y.A. et al., "Noise utilization as an approach for reducing energy consumption in street lighting," Plos one, vol. 14, No. 7, Jul. 11, 2019, 12 pg.

Chaithanya, D.J. et al., "Power Generation Using Sound by Piezo Electric Material," In Journal of Physics: Conference Series, May 1, 2021, vol. 1916, No. 1, IOP Publishing, 6 pg.

Bacosa, Jr., C.a. et al., "Sound Energy: An Electric Source of Noise Pollution Based Power Bank," In 4th International Research Conference on Higher Eduction, KnE Social Sciences, vol. 2018, pp. 221-242.

* cited by examiner

DIRECTED ENERGY CONVERSION AND DISTRIBUTION

TECHNICAL FIELD

This disclosure relates the generation and distribution of energy, and more particularly, to using less conventional sources of electrical energy.

BACKGROUND

The modern world faces challenges in providing energy resources everywhere that those resources are needed. Not surprisingly, there are concerted efforts underway to find and harness alternative and renewable energy sources. As a commodity, energy is often termed a good. While energy and other goods are typically considered to be scarce, so-called "bads" never seem to be in short supply. One such item for which there often seems to an overabundance loud sometimes annoying sounds, often termed noise pollution.

SUMMARY

In one or more embodiments, a computer-implemented method can include converting sound energy to electrical energy using one or more energy converters positioned within a predetermined area. The method can include classifying each of a plurality of devices wherein the classifying indicates an energy requirement of each device. The method can include allocating the electrical energy to one or more of the devices based on the classifying. The method can include controlling delivery of the electrical energy allocated to each of the one or more devices using a switching mechanism to create a transmission channel for each of the one or more devices.

In one or more embodiments, a system includes a processor configured to initiate operations. The operations can include converting sound energy to electrical energy using one or more energy converters positioned within a predetermined area. The operations can include classifying each of a plurality of devices wherein the classifying indicates an energy requirement of each device. The operations can include allocating the electrical energy to one or more of the devices based on the classifying. The operations can include controlling delivery of the electrical energy allocated to each of the one or more devices using a switching mechanism to create a transmission channel for each of the one or more devices.

In one or more embodiments, a computer program product includes one or more computer readable storage media having instructions stored thereon. The instructions are executable by a processor to initiate operations. The operations can include converting sound energy to electrical energy using one or more energy converters positioned within a predetermined area. The operations can include classifying each of a plurality of devices wherein the classifying indicates an energy requirement of each device. The operations can include allocating the electrical energy to one or more of the devices based on the classifying. The operations can include controlling delivery of the electrical energy allocated to each of the one or more devices using a switching mechanism to create a transmission channel for each of the one or more devices.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
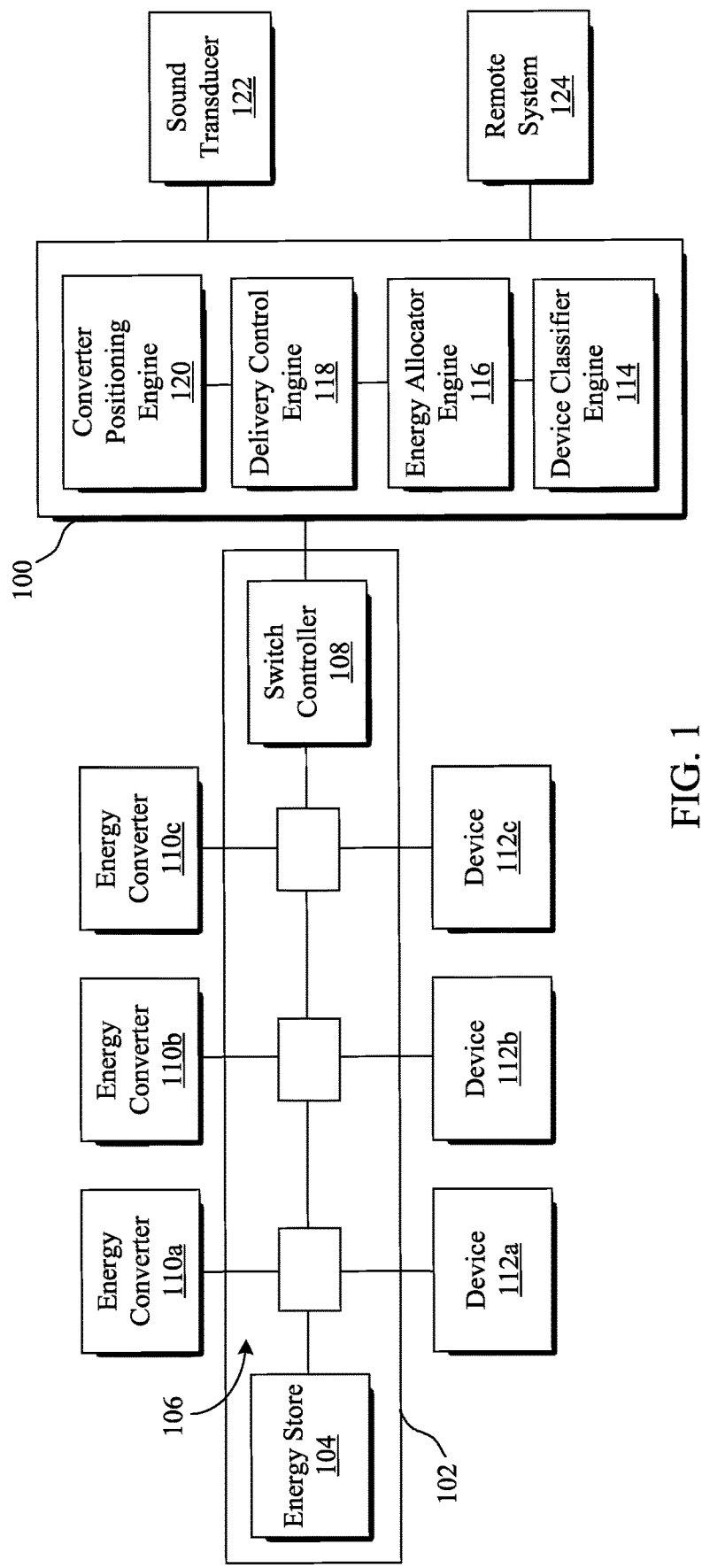
FIG. 1 illustrates an example energy conversion and distribution system.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates the generation and distribution of energy, and more particularly, to using less conventional sources of electrical energy. One largely untapped source of energy is sound. Although there are various techniques to convert sound waves to electrical energy, to date there are few if any efficient ways to identify consistent sources of sound that can be used reliably to use for generating electrical energy. There are few if any efficient ways to identify specific devices that are suitably matched to such sources of energy or to channel electrical energy to such devices even if identified.

In accordance with the inventive arrangements described within this disclosure, example methods, systems, and computer program products are provided that are capable of converting sound energy to electrical energy and distributing the energy to different devices according to the energy requirements of each. An aspect of the inventive arrangements disclosed herein is classifying devices. Another aspect is arranging within a predetermined area one or more energy converters at positions most likely to optimally convert the sound to electrical energy. Yet another aspect of the inventive arrangements disclosed is the mapping of energy conversion to specific devices so as to most likely and consistently meet the energy demands of the devices.

These and other aspects of the invention provide improvements over existing energy generation and distribution technologies, especially those pertaining to unconventional energy sources. Sound generation can be unpredictable, making it difficult to predict and allocate effectively and efficiently the conversion of sound energy to electrical energy. An aspect of the inventive arrangements disclosed is predicting quantities of electrical energy that can be converted from sound energy. Another aspect is allocation of the electrical energy in response to time-based energy requirements of multiple devices.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 2:
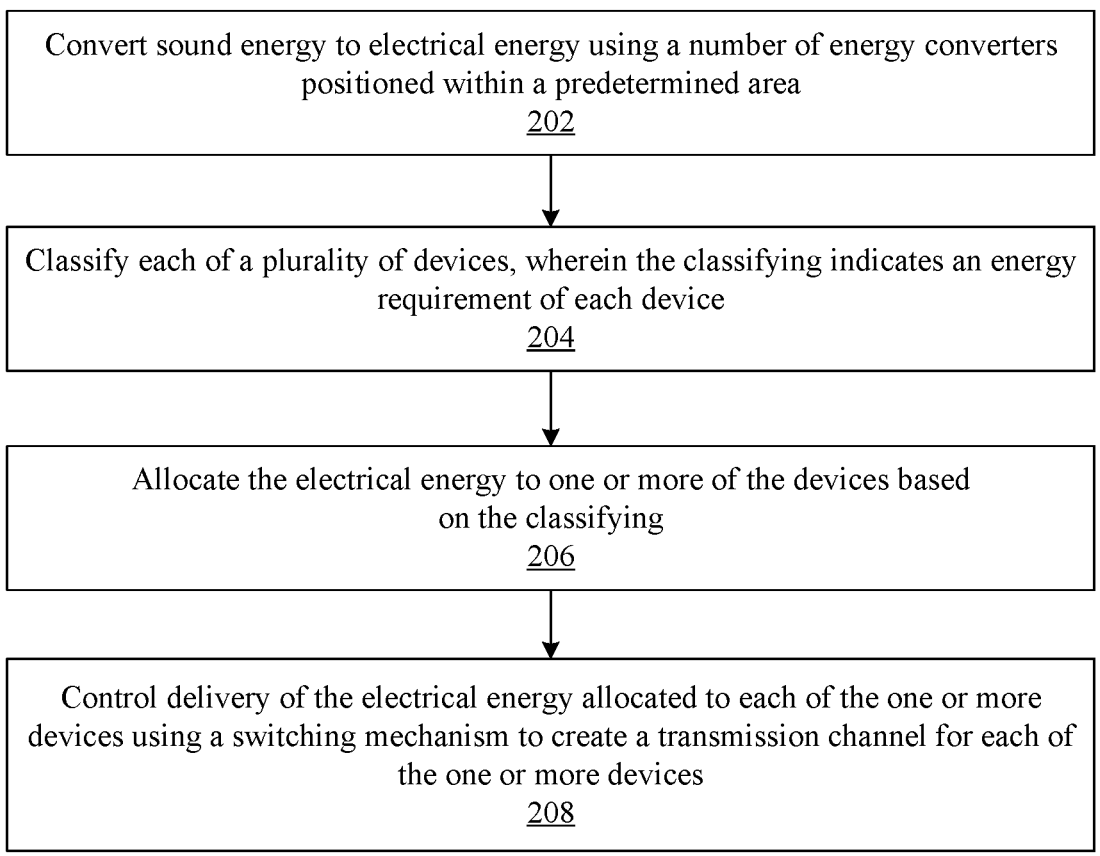
FIG. 2 illustrates an example method of directing the conversion and distribution of energy using the system of FIG. 1.
Figure 3:
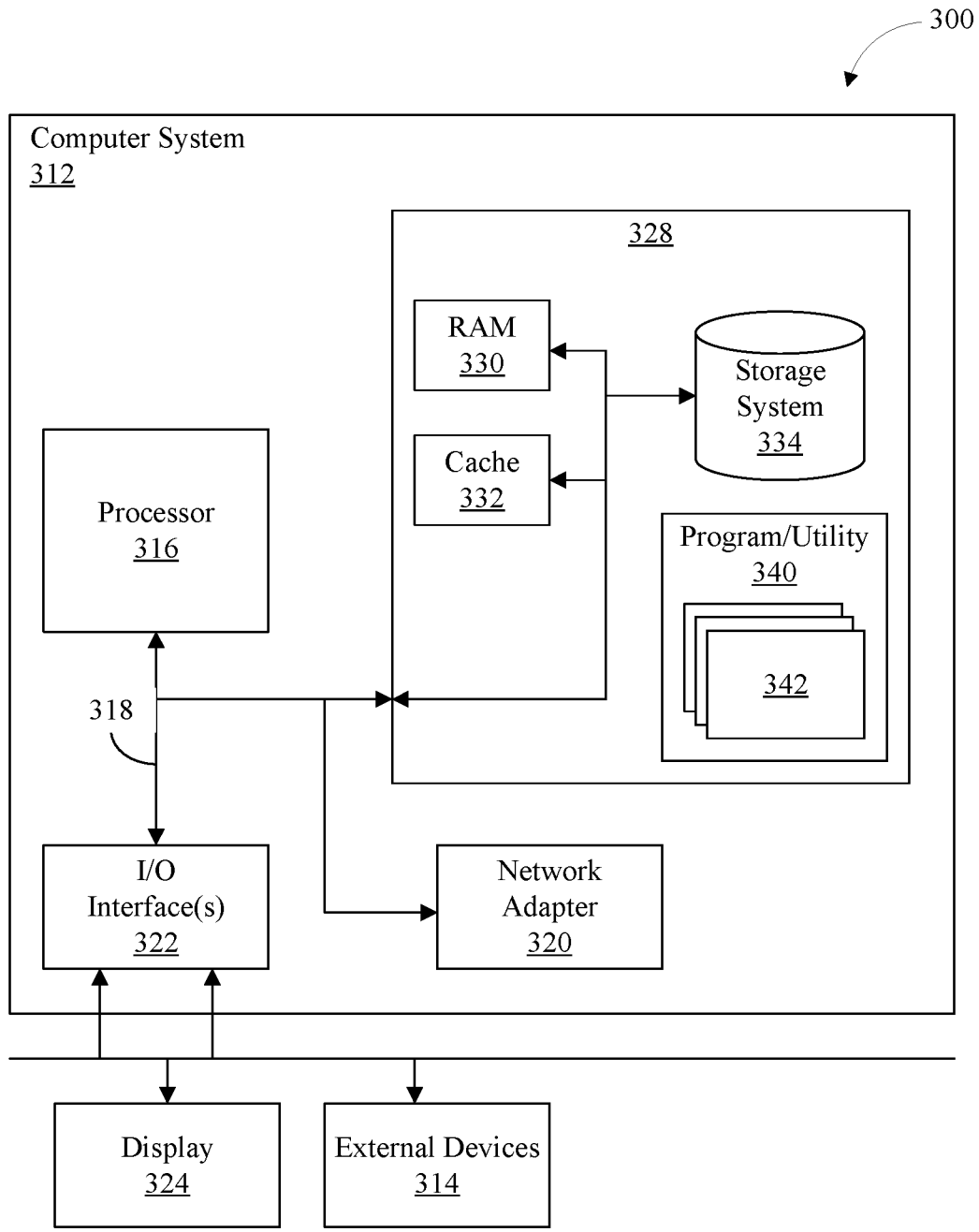
FIG. 3 illustrates an example a computing node.

FIGS. 1 and 2, respectively, illustrate example energy conversion and distribution (ECD) system 100 and example methodology 200, aspects of which can be performed by ECD system 100. ECD system 100 in various embodiments can be implemented in hardware (e.g., dedicated hardwired circuitry), software (e.g., program code executed by one or more processors), or a combination thereof. For example, system 100 in certain embodiments is implemented in a computing node such as computing node 300 (e.g., cloud-based server), in which system 100 comprises program code that is electronically stored in a memory such as memory 328 and executes on one or more processors such as processor 316 of computer system 312 (FIG. 3).

Illustratively, ECD system 100 communicatively couples via a wired or wireless connection over a communication network (e.g., local area network, wide area network, the Internet) with switching unit 102. Switching unit 102 comprises energy store 104 (e.g., battery), switches 106, and switch controller 108, which operatively controls switches 106. Switching unit 102 illustratively couples with energy converters 110a, 110b, and 110n. Although only three energy converters are explicitly shown, it is to be understood that switching unit 102 can couple with more or fewer energy converters than those explicitly shown. Energy converters 110a-110n convert vibrations induced by sound waves into electrical energy via electromagnetic induction. In certain embodiments, energy converters 110a-110n comprise piezo transducers that produce electrical energy in response to mechanical pressure.

At block 202, energy converters 110a-110n positioned within a predetermined area convert sound energy that is generated by the occurrence of sounds within the vicinity into electrical energy, the electrical energy illustratively fed to switching unit 102. The electrical energy can be stored in energy store 104 and/or transferred via a transmission channel with one or more devices 112a, 112b, and 112n. Again, it is to be understood that more or fewer such energy-consuming devices can couple with switching unit 102 than those illustrated.

At block 204, device classifier engine 114 is capable of classifying devices 112a-112n based on energy requirements of devices 112a-112n. In accordance with the performance of various operations described below, device classifier engine 114 classifies devices 112a-112n based on various energy requirements of devices 112a-112n. The energy requirements, in some arrangements, are strictly needs based. In other arrangements, however, the energy requirements are also contextually based. Depending on the contextual factors used by device classifier engine 114 for classifying devices 112a-112n, different devices can be granted differing priorities for allocating the energy available from the conversion of sound energy to electrical energy by energy converters 110a-110n.

At block 206, energy allocator engine 116 is capable of allocating the energy made available from the conversion of sound energy to electrical energy, allocating the electrical energy to one or more of devices 112a-112n. The energy allocated to one or more of devices 112a-112n is based on the classifying devices 112a-112n, as performed by device classifier engine 114. Moreover, in some arrangements, in which future energy needs of devices 112a-112n are predicted (described below), some or all the energy may be diverted from devices 112a-112n and instead allocated to energy store 104.

At block 208, delivery control engine 118 is capable of controlling delivery of the allocated electrical energy. Delivery control engine 116 in certain embodiments issues instructions to switch controller 108 of switching unit 102, which is communicatively coupled with ECD system 100. The instructions can identify specific devices and can indicate a specific quantity of energy delivered to the specific devices via channel through switches 106 and/or from energy store 104. For identifying devices and issuing instructions, ECD system 100 can communicate via wired or wireless connection with switch control 108. ECD system 100 by communicating instructions to switch controller 108 for controlling switches 106 can selectively route power between one or more of devices 112a-112n and/or energy store 104 in accordance with the allocation made by energy allocator engine 116. ECD system 100 can identify and communicate with devices 112a-112n, as well. If implemented, for example, in a computer system such as computer system 312, ECD system 100 can identify and communicate with devices such as devices 112a-112n over one or more networks such as a local area network (LAN), a general wide area network (WAN), and/or a public network (e.g., the Internet) via a network adapter (FIG. 3).

ECD system 100 implemented in such a computer system also can communicate with devices 112a-112n and switching unit 102, for example, via a wireless communication subsystem integrated in the computer system or operating as a type of external device operatively coupled with the computer system. The wireless communication subsystem can be designed to operate over one or more mobile networks, Wi-Fi networks, short range wireless networks (e.g., a Bluetooth, UWB), and/or any combination of the foregoing. In certain arrangements, devices 112a-112n can comprise or be part of an integrated system of IoT devices that communicate with ECD system 100 on a continuous or near continuous basis or at regular intervals. Moreover, in some arrangements, devices such as devices 112a-112n can register with ECD system 100, conveying to ECD system 100 their identities and other pertinent data upon registration.

Based upon the data, ECD system 100 is capable of applying context to the allocation of electrical energy converted from sound energy to devices 112a-112n. The data can include, for example and without limitation, a device's energy charging duration, energy consumption, charge capacity, and patterns of usage. Based on patterns of usage, device classifier engine 114 can correlate a device's energy consumption with different times, which can capture patterns of heavy energy consumption at certain times and lighter energy consumption at different times. The correlation between energy consumption and time may vary depending on the specific devices and the predetermined area where ECD system 100 is operable (either remotely or on-site).

In some embodiments, devices 112a-112n as registered devices are tracked by ECD system 100, which compiles the data to determine usage patterns. The data such as energy charging duration, energy consumption, charge capacity, and times of usage can be compiled and used by ECD system 100 to generate feature vectors corresponding to each of devices 112a-112n. The feature vectors can be input into a model implemented by device classifier engine 114, which determines based on the input an expected amount of energy needed to run or charge each device at one or more specific times and classifies each of the devices accordingly. Likewise, as described below, ECD system 100 can predict the quantities of electrical energy converted from sound energy by energy converters 110a-110n in the predetermined area and the times that the quantities are generated. Based on correlating the energy requirements of the devices and the corresponding quantities of electrical energy available, energy allocator engine 116 can allocate energy based on predetermined criteria.

For example, in one scenario, ECD system 100 controls distribution of energy generated by sounds at a construction site. The energy may be used to meet low-energy requirements for running one or more on-site laptops and/or charging mobile devices (e.g., smartphones). The electrical energy supplied is converted from noises generated at the site during the day and supplied contemporaneously. Alternatively, in a different scenario, ECD system 100 controls the distribution of electrical energy converted from sound energy generated by the sounds of traffic at an ordinarily busy intersection. ECD system 100 directs the electrical energy to powering lights along adjacent pathways. The sounds that generate sound energy used for conversion to electrical energy occur primarily during the day, especially at rush hour, but is needed at night, when traffic noise is least. Accordingly, a significant portion of electrical energy converted from sound energy during the day is allocated by energy allocator 116 to energy store 104 and released in the evening to the lights along the adjacent pathways. In still another scenario, ECD system 100 controls energy distribution in a home or office. In the home or office, electrical energy may be converted by one or more in-home or in-office energy converters. In the home, electrical energy may be generated primarily in the early morning and early evening by converting conversations activities occurring in the morning in the kitchen around the breakfast table and in the dining room in the evening. In the office, electrical energy is generated primarily during the daytime when office activity is greatest. Energy allocator 116 can allocate energy according to time-based need, and delivery controller 118 can direct energy generated in early morning and early evening in the home to an energy store for use charging portable devices overnight. Conversely, energy allocator 116 can allocate energy generated in the office for contemporaneous daytime use as office conversation and activity sounds are converted to electrical energy.

Optionally, converter positioning engine 120 extracts signal data from audio signals captured by sound transducer 122 positioned within the predetermined area. Converter positioning engine 120 determines, based on the signal data, a likely optimal number of energy converters to position within the predetermined area, and, for each energy converter, a likely optimal energy-capture position within the predetermined area. An optimal energy-capture position is one that converter positioning engine 120 determines is most likely to capture over a predetermined time interval the greatest amount of sound energy for converting to electrical energy.

In some embodiments, sound transducer 122 comprises a 360-degree microphone array. Sound transducer 122 communicatively couples via a wired or wireless connection to ECD system 100 and conveys the audio data to converter positioning engine 120. The audio data can include, for example and without limitation, sound intensity, consistency of sound, sound duration, timing of different levels of intensity. One or more beamforming techniques can be implemented with sound transducer 122 to selectively detect the direction of sound waves for capturing sounds.

In some embodiments, converter positioning engine 120 implements a model for identifying the number of conversion devices needed and their placement for likely optimal energy conversion using the audio data as input to the model. For example, the model can be a machine learning model (e.g., deep learning or multi-layer neural network) trained using a training set of feature vectors comprising features such as sound intensity, consistency of sound, sound duration, timing of different levels of intensity and the like. A set of feature vectors used to train the model can be labeled according to class, where each class corresponds to a planar map showing specific positions of a specific number of energy converters. Once trained, the model can predict an optimal number and positioning of energy converters in the predetermined area based on inputs captured by sound transducer 122. Inputs to the model (feature vectors) are generated by the characteristics of sounds captured by sound transducer 122 within the predetermined area. The model, based on the input, indicates the class corresponding to the captured characteristics. The class corresponds to a map for positioning the specific number of energy converters.

In some embodiments, an initial number and the positioning of energy converters 112a-112n can be determined based on running multiple digital twin simulations. The digital twin simulations can include simulating sound energy from different sounds occurring within differently dimensioned areas and simulating the converting of the sound energy generated by the different sounds to electrical energy using various arrangements of different energy converters at different positions within a simulated area. Likewise, the feature vectors used in training the machine learning model can comprise features corresponding to those generated by the digital twin simulations.

In certain embodiments, ECD system 100 converts waveforms of audio signals captured by sound transducer 122 into frequency spectra corresponding to different sounds. Implementing a Fast Fourier Transform (FFT), ECD system 100 separates the audio signals into frequency-based segments $F=\{F_1, F_2, \ldots, F_n\}$. The frequency-based segments $F=\{F_1, F_2, F_n\}$ are input to a convolutional neural network (CNN) implemented by ECD system 100 and trained to identify different audio sounds $A=\{A_1, A_2, \ldots, A_n\}$ at times $T=\{T_1|F'_1, T_2|F'_2, \ldots, T_n|F'_{n1}\}$, where $F_i'$ indicates the i-th frequency conglomerate detected at the i-th interval within the training phase. The output layer of the multi-layer CNN generates a value corresponding to a particular class of numerically encoded audio signals (sounds) corresponding to the different frequencies. If an unrecognized sound is detected, it is fed to a pre-trained CNN model for training the pre-trained CNN model using transfer learning, which captures parameters (weights) of previously the trained CNN model to train the n-th layer of hidden units within the pre-trained CNN model.

The different sounds thus provide via the CNN model a kind of frequency signature. Each distinct sound thus can be identified based on its frequency signature. This can enable ECD system 100 to track individual sounds and determine which occur at which times with what intensity (which in turn influences the amount of electrical energy conversion). Extracting signal data from audio signals captured by sound transducer 122 positioned within the predetermined area and performing signal processing on the signal data to determine a frequency spectrum of each distinct sound identifiable from the audio signals, ECD system 100 is able to map each distinct sound to its unique frequency signature determined based on the frequency spectrum of each distinct sound and identify based on each unique frequency signature one or more times during a predetermined interval that each distinct sound occurs within the predetermined area. ECD system 100 can determine a quantity of electrical energy producible by converting sound energy generated by each distinct sound. Correlating one or more distinct sounds with one or more of devices 112a-112n, ECD system 100 can match energy requirements of the one or more devices with the quantity of electrical energy producible by the one or more distinct sounds. Based on the matching, ECD system 100 can allocate electrical energy produced from different sounds to matched devices.

Example Table 1, below, illustrates an allocation of electrical energies produced from different sounds identified based on their frequency signature and matched to different devices (fourth column). The time and location (first column), intensity and direction (second column), as well as energy produced (third column), by the sounds are matched with each device's power specification (fifth column). The last column indicates whether the energy produced at the given time is sufficient to meet the device's power requirement.

In other embodiments, ECD system 100 can receive an external feed from remote system 124. Remote system 124 can include, for example, a weather service, calendaring system, social media platform, or other data provider. The external feed can provide ECD system 100 with data of an impending change in the environment of the predetermined area that can affect future conversion of sound energy to electrical energy and/or the distribution of the electrical energy. For example, the external feed can be from a weather channel indicating a predicted thunderstorm that is likely to affect the capture and conversion of sound energy at certain outdoor locations, such as a construction site. ECD system 100 can respond to the predication of an impeding thunderstorm by directing all or a select portion of electrical energy that is currently converted from sound energy by energy converters 110 to energy store 104 and away from devices 112a-112n in anticipation of a need for stored energy when construction stops and the sounds currently utilized cease as well. Similarly, ECD system 100 may be utilized to direct electrical energy converted from traffic sounds at an intersection to power adjacent sidewalk lighting. In response to an external feed indicating a date and time of closure of the streets for repair, ECD system 100 can direct a select portion of electrical energy to energy store 104 for use during the period that there is no noisy traffic due to the temporary street closure. ECD system 100 thus can divert energy that might otherwise ordinarily have been shared with a charging station located nearby to energy store 104 for later use powering sidewalk lighting during the closure when there is little or no noise from street traffic.

TABLE 1

| TIME & LOCATION | SOUND INTENSITY & DIRECTION | ENERGY PRODUCED | ENERGY-CONSUMING DEVICE | DEVICE POWER SPECIFICATION | DEVICE POWER REQUIREMENT MET WITH ENERGY PRODUCED |
|---|---|---|---|---|---|
| Feb. 20, 2021T00:00 . . . [x1, y1] | x1 db | 10 mA | SmartWatch | x1 mA | Yes |
| Feb. 20, 2021T00:01 . . . [x1, y1] | x2 db | 110 mA | iPhone ® | x2 mA | Not now |
| Feb. 20, 2021T00:11 . . . [x1, y1] | y1 db | 80 mA | Alexa ® | x3 mA | Yes |
| Feb. 20, 2021T00:02 . . . [x2, y2] | y2 db | 150 mA | Pathway strip | y1 mA | Yes |
| Feb. 20, 2021T00:12 . . . [x2, y2] | xx db | 100 mA | Router | y2 mA | Yes |
| Feb. 20, 2021T00:22 . . . [x2, y2] | xy db | 90 mA | Sound system | xy mA | No match |

In some embodiments, ECD 100 uses reinforcement learning to determine the desired position of an energy converter within a predetermined area. ECD system 100, using reinforcement learning, acts as an agent that makes observations and takes actions within an environment, receiving positive and negative rewards for each action based on a predetermined policy. The observations are the sound intensities measured by sound transducer 122, and the environment is the predetermined area, within which sound transducer mounted on a self-propelled vehicle moves randomly while wirelessly conveying to ECD system 100 the measured sound intensity at different locations. Implementing a policy gradient that grants a positive reward in response to movements that increase sound intensity and a negative reward for movements that decrease sound intensity, ECD system 100 can track movements of sound transducer 122 and learn which location(s) correspond to an optimal position for capturing sound energy to convert to electrical energy with an energy converter. Through reinforcement learning, ECD system 100 used for example in a home environment described above can learn to position an energy converter in the home kitchen in the morning and in the dining room in the early evening.

In still other embodiments, the external feed to ECD system 100 can be user input identifying certain of devices 112a-112n for receiving energy at designated times. For example, in anticipation of leaving for the airport to depart by plane on a trip, a user may input a date and time to ECD system 100, which daily converts sounds generated in the user's home to electrical energy. The date and time can indicate that the user will be charging a smartphone, laptop, and or other portable device at the designated time on the specified date. ECD system 100 can store in energy store 104 electrical energy converted from sound energy generated in the user's home so as to ensure that it is available at the designated time on the specified date. Based on information acquired by ECD system 100 from tracking registered devices, ECD system 100 can determine an historical average of the charging demands of each device use it as the measure of the amount of energy to direct to energy store 104 to ensure sufficient energy is available for charging each of the indicated devices at the designated time on the specified date. Energy that otherwise would have been used to power household items (e.g., appliances, television, lighting) and/or other portable devices is instead diverted to energy store 104.

FIG. 3 illustrates a schematic of an example of a computing node 300. In one or more embodiments, computing node 300 is an example of a suitable cloud computing node. Computing node 300 is not intended to suggest any limitation as to the scope of use or functionality of embodiments of the invention described herein. Computing node 300 is capable of performing any of the functionality described within this disclosure.

Computing node 300 includes a computer system 312, which is operational with numerous other general-purpose or special-purpose computing system environments or configurations. Examples of well-known computing systems, environments, and/or configurations that may be suitable for use with computer system 312 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device. The components of computer system 312 may include, but are not limited to, one or more processors 316, a memory 328, and a bus 318 that couples various system components including memory 328 to processor 316. As defined herein, "processor" means at least one hardware circuit configured to carry out instructions. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

The carrying out of instructions of a computer program by a processor comprises executing or running the program. As defined herein, "run" and "execute" comprise a series of actions or events performed by the processor in accordance with one or more machine-readable instructions. "Running" and "executing," as defined herein refer to the active performing of actions or events by the processor. The terms run, running, execute, and executing are used synonymously herein.

Bus 318 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system-readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. For example, one or more of the program modules may include an ECD system, such as system 100, or portions thereof.

Program/utility 340 is executable by processor 316. Program/utility 340 and any data items used, generated, and/or operated upon by computer system 312 are functional data structures that impart functionality when employed by computer system 312. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via input/output (I/O) interfaces 322. Still, computer system 312 can communicate with one or more networks such as a LAN, a WAN, and/or a public network (e.g., the Internet) via network adapter 320. Computer system 312 also can communicate with other devices via a wireless communication subsystem integrated in computing node 3 100 or operating as a type of external device 314 operatively coupled with computer system 312. The wireless communication subsystem can be designed to operate over one or more mobile networks, Wi-Fi networks, short range wireless networks (e.g., a Bluetooth, UWB), and/or any combination of the foregoing.

As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a computing node, such as a cloud computing node, it should be appreciated that a computer system using an architecture the same as or similar to that described in connection with FIG. 3 may be used in either cloud or non-cloud computing implementations in performing the various operations described herein. In this regard, the example embodiments described herein are not intended to be limited to any single type of computing environment. Computing node 300 is an example of a data processing system. As defined herein, "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Computing node 300 is also an example of a server (e.g., cloud-based server). As defined herein, "server" means a data processing system configured to share services with one or more other data processing systems and/or devices, including client devices. As defined herein, "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, and the like. In one or more embodiments, the various user devices described herein may be client devices. Network infrastructure, such as routers, firewalls, switches, access points and the like, are not client devices as the term "client device" is defined herein.

It is expressly noted that although this disclosure includes a detailed description on cloud computing, implementations of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
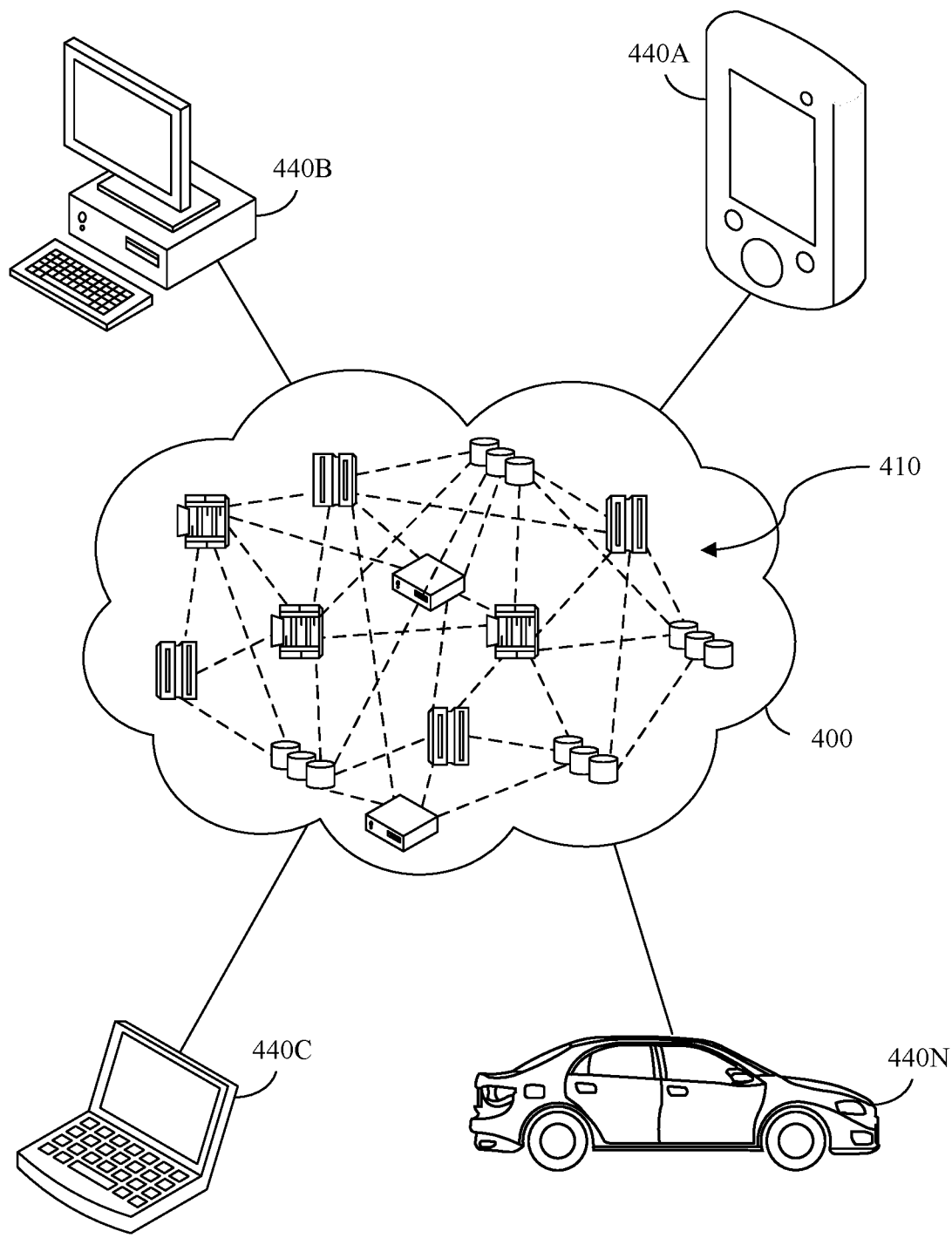
FIG. 4 illustrates an example cloud computing environment.

Referring now to FIG. 4, illustrative cloud computing environment 400 is depicted. As shown, cloud computing environment 400 includes one or more cloud computing nodes 410 with which local computing devices used by cloud consumers, such as, for example, personal digital assistant (PDA) or cellular telephone 440a, desktop computer 440b, laptop computer 440c, and/or automobile computer system 440n may communicate. Computing nodes 410 may communicate with one another. They may be grouped (not shown) physically or virtually, in one or more networks, such as Private, Community, Public, or Hybrid clouds as described hereinabove, or a combination thereof. This allows cloud computing environment 400 to offer infrastructure, platforms and/or software as services for which a cloud consumer does not need to maintain resources on a local computing device. It is understood that the types of computing devices 440a-n shown in FIG. 4 are intended to be illustrative only and that computing nodes 410 and cloud computing environment 400 can communicate with any type of computerized device over any type of network and/or network addressable connection (e.g., using a web browser).

Figure 5:
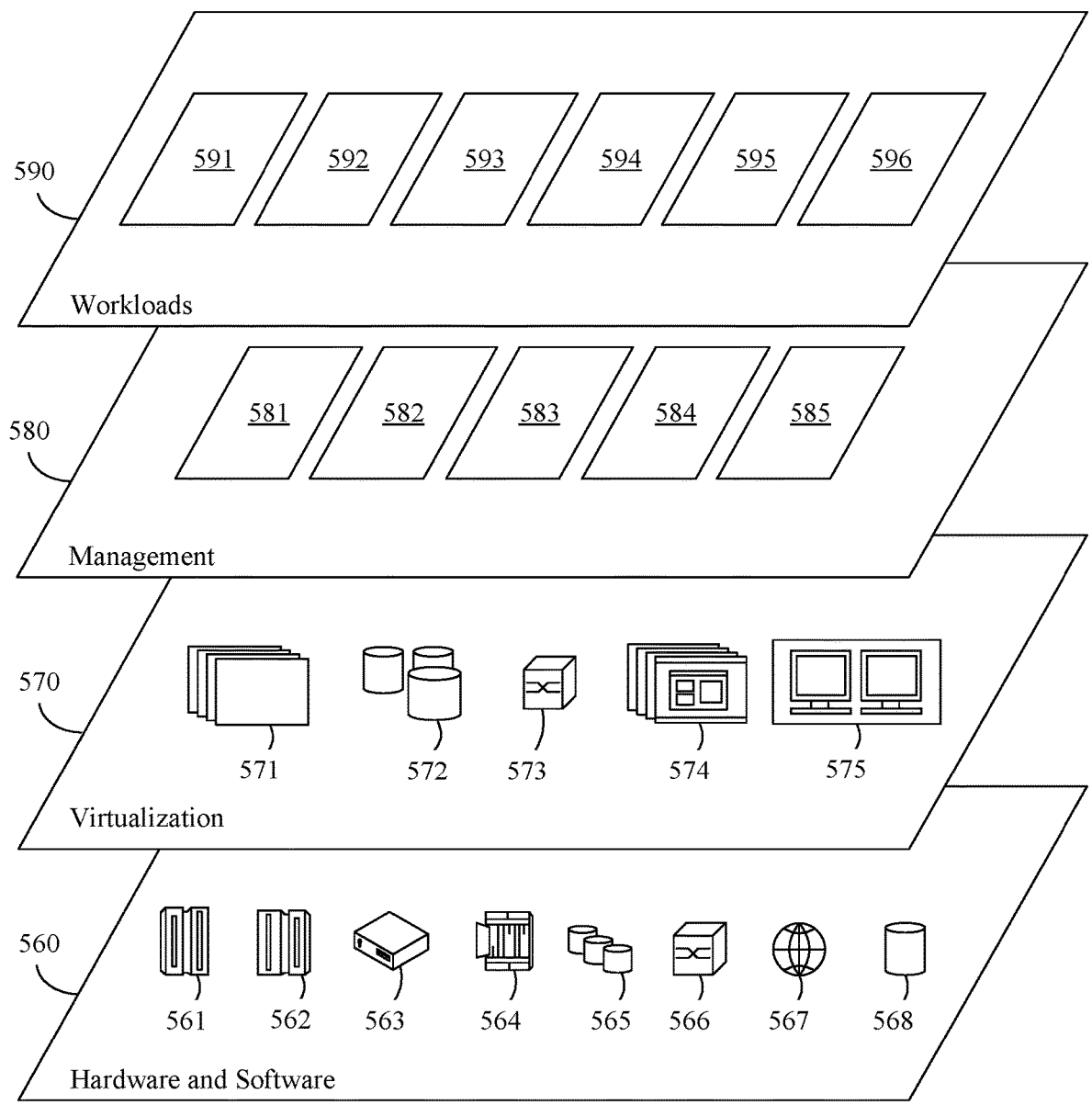
FIG. 5 illustrates example abstraction model layers.

Referring now to FIG. 5, a set of functional abstraction layers provided by cloud computing environment 400 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components.

Examples of hardware components include mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below.

Resource provisioning 581 provides dynamic procurement of computing resources and other resources that are utilized to perform tasks within the cloud computing environment. Metering and Pricing 582 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 583 provides access to the cloud computing environment for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: mapping and navigation 591; software development and lifecycle management 592; virtual classroom education delivery 593; data analytics processing 594; transaction processing 595; and ECD system 596.

The terminology used herein is for the purpose of describing particular embodiments only and is not intended to be limiting. Notwithstanding, several definitions that apply throughout this document now will be presented.

As defined herein, the singular forms "a," "an," and "the" include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "in response to" or "responsive to," depending upon the context. Thus, the phrase "if it is determined" may be construed to mean "in response to determining" or "responsive to determining" depending on the context. Likewise the phrase "if [a stated condition or event] is detected" may be construed to mean "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the phrases "in response to" and "responsive to" mean responding or reacting readily to an action or event. Thus, if a second action is performed "in response to" or "responsive to" a first action, there is a causal relationship between an occurrence of the first action and an occurrence of the second action. The phrases "in response to" and "responsive to" indicate the causal relationship.

As defined herein, "real-time" means a level of processing responsiveness that a user or system senses as sufficiently immediate for a particular process or determination to be made, or that enables the processor to keep up with some external process.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, "user," "decision maker," "candidate," "individual," and "member" each refer to a human being.

The terms first, second, etc. may be used herein to describe various elements. These elements should not be limited by these terms, as these terms are only used to distinguish one element from another unless stated otherwise or the context clearly indicates otherwise.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration and are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented process for distributing energy, the computer-implemented process comprising:
    extracting signal data from audio signals captured by a sound transducer positioned within a determined area;
    determining, based on the extracted signal data, a number of energy converters;
    determining, based on the extracted signal data, an energy-capture position, within the determined area, for each energy converter of the determined number of energy converters;
    converting, by the determined number of energy converters positioned within the determined area, sound energy to electrical energy;
    classifying, with a device classifier engine, each device of a plurality of devices, wherein the classifying indicates an energy requirement of each device of the plurality of devices;
    allocating, with an energy allocator engine, based on the classifying, the electrical energy to one or more devices of the plurality of devices; and
    controlling, with a delivery controller, delivery of the allocated electrical energy to each device of the one or more devices using a switching mechanism to create a transmission channel for each device of the one or more devices.

2. The computer-implemented process of claim 1, further comprising:
    predicting, based on the extracted signal data, a quantity of the electrical energy generated within a determined time by the converting.

3. The computer-implemented process of claim 1, wherein the energy-capture position is a position where greatest amount of the sound energy for the conversion into the electrical energy is captured.

4. The computer-implemented process of claim 1, further comprising:
    predicting times for the conversion of the sound energy to the electrical energy based on recognizing patterns of sounds captured by one or more sound transducers during a determined time interval, wherein the one or more sound transducers include the sound transducer.

5. The computer-implemented process of claim 1, further comprising:
    determining, based on a plurality of digital twin simulations, the number of energy converters and, for each energy converter of the determined number of energy converters, the energy-capture position within the determined area, wherein the plurality of digital twin simulations includes:
    simulating the sound energy from different sounds occurring within differently dimensioned areas, and
    simulating the converting of the sound energy generated by the different sounds to the electrical energy using various arrangements of different energy converters at different positions with a simulated area.

6. The computer-implemented process of claim 1, wherein
    the classifying includes predicting, for each device of the plurality of devices, a time-based energy requirement based on patterns of energy consumption over a determined time interval.

7. The computer-implemented process of claim 1, wherein
    the allocating includes storing a portion of the electrical energy based on at least one of a predicted event likely to affect future converting or user-specified input specifying a future need for the portion of the electrical energy.

8. The computer-implemented process of claim 1, further comprising:
    positioning at least one energy converter of the determined number of energy converters within the determined area using a self-propelled vehicle and the sound transducer, wherein
    the sound transducer is configured to determine an intensity of sounds occurring within the determined area at different locations during a determined time interval; and
    selecting a location from the different locations based on learning the energy-capture position using reinforced learning that implements a gradient policy.

9. The computer-implemented process of claim 1, further comprising:
    performing signal processing on the signal data to determine a frequency spectrum of each distinct sound of one or more distinct sounds identifiable from the audio signals;
    mapping each distinct sound of the one or more distinct sounds to a unique frequency signature determined based on the frequency spectrum of each distinct sound of the one or more distinct sounds;
    identifying, based on the unique frequency signature, one or more times during a determined time interval that each distinct sound of the one or more distinct sounds occurs within the determined area;
    determining a quantity of the electrical energy producible by the converting of the sound energy generated by each distinct sound of the one or more distinct sounds; and
    correlating the one or more distinct sounds with the one or more devices by matching the energy requirement of the one or more devices and the quantity of the electrical energy producible by the one or more distinct sounds, wherein the allocating is based at least in part on the correlating.

10. A system, comprising:
a processor configured to:
extract signal data from audio signals captured by a sound transducer positioned within a determined area;
determine, based on the extracted signal data, a number of energy converters;
determine, based on the extracted signal data, an energy-capture position, within the determined area, for each energy converter of the determined number of energy converters;
convert, based on the determined number of energy converters positioned within the determined area, sound energy to electrical energy;
classify each device of a plurality of devices, wherein the classification indicates an energy requirement of each device of the plurality of devices;
allocate, based on the classification, the electrical energy to one or more devices of the plurality of devices; and
control delivery of the allocated electrical energy to each device of the one or more devices using a switching mechanism to create a transmission channel for each device of the one or more devices.

11. The system of claim 10, wherein the processor is further configured to:
predict, based on the extracted signal data, a quantity of the electrical energy generated within a determined time by the conversion.

12. The system of claim 10, wherein the processor is further configured to:
predict times for the conversion of the sound energy to the electrical energy based on recognition of patterns of sounds captured by one or more sound transducers during a determined time interval, wherein the one or more sound transducers include the sound transducer.

13. The system of claim 10, wherein the processor is further configured to:
determine, based on a plurality of digital twin simulations, the number of energy converters and, for each energy converter of the determined number of energy converters, the energy-capture position within the determined area, wherein the plurality of digital twin simulations includes:
simulation of the sound energy from different sounds occurring within differently dimensioned areas, and
simulation of the conversion of the sound energy generated by the different sounds to the electrical energy using various arrangements of different energy converters at different positions with a simulated area.

14. The system of claim 10, wherein
the classification includes prediction, for each device of the plurality of devices, of a time-based energy requirement based on patterns of energy consumption over a determined time interval.

15. The system of claim 10, wherein
the allocation includes storage of a portion of the electrical energy based on at least one of a predicted event likely to affect future conversion or user-specified input that specifies a future need for the portion of the electrical energy.

16. The system of claim 10, wherein the processor is further configured to:
position at least one energy converter of the determined number of energy converters within the determined area using a self-propelled vehicle and the sound transducer, wherein
the sound transducer is configured to determine an intensity of sounds that occur within the determined area at different locations during a determined time interval; and
select a location from the different locations based on learning the energy-capture position using reinforced learning that implements a gradient policy.

17. The system of claim 10, wherein the processor is further configured to:
perform signal processing on the signal data to determine a frequency spectrum of each distinct sound of one or more distinct sounds identifiable from the audio signals;
map each distinct sound of the one or more distinct sounds to a unique frequency signature determined based on the frequency spectrum of each distinct sound of the one or more distinct sounds;
identify, based on the unique frequency signature, one or more times during a determined time interval that each distinct sound of the one or more distinct sounds occurs within the determined area;
determine a quantity of the electrical energy producible by the conversion of the sound energy generated by each distinct sound of the one or more distinct sounds; and
correlate the one or more distinct sounds with the one or more devices by a match of the energy requirement of the one or more devices and the quantity of the electrical energy producible by the one or more distinct sounds, wherein the allocation is based at least in part on the correlation.

18. A computer program product, the computer program product comprising:
one or more computer-readable storage media and program instructions collectively stored on the one or more computer-readable storage media, the program instructions executable by a processor to cause the processor to initiate operations including:
extracting signal data from audio signals captured by a sound transducer positioned within a determined area;
determining, based on the extracted signal data, a number of energy converters;
determining, based on the extracted signal data, an energy-capture position, within the determined area, for each energy converter of the determined number of energy converters;
converting, based on the determined number of energy converters positioned within the determined area, sound energy to electrical energy;
classifying each device of a plurality of devices, wherein the classifying indicates an energy requirement of each device of the plurality of devices;
allocating, based on the classifying, the electrical energy to one or more devices of the plurality of devices; and
controlling delivery of the allocated electrical energy to each device of the one or more devices using a switching mechanism to create a transmission channel for each device of the one or more devices.

19. The computer program product of claim 18, wherein the program instructions are executable by the processor to cause the processor to initiate the operations further including:
  predicting, based on the extracted signal data, a quantity of the electrical energy generated within a determined time by the converting.

* * * * *